US008657661B2

(12) United States Patent
Sharoni

(10) Patent No.: US 8,657,661 B2
(45) Date of Patent: Feb. 25, 2014

(54) MULTI-CHANCE CASINO GAME

(76) Inventor: Ron Sharoni, Port Washington, NY (US)

( * ) Notice: Subject to any disclaimer, the term of this patent is extended or adjusted under 35 U.S.C. 154(b) by 0 days.

(21) Appl. No.: 13/264,296

(22) PCT Filed: May 2, 2011

(86) PCT No.: PCT/US2011/034779
§ 371 (c)(1), (2), (4) Date: Oct. 13, 2011

(87) PCT Pub. No.: WO2011/142995
PCT Pub. Date: Nov. 17, 2011

(65) Prior Publication Data

US 2013/0053119 A1 Feb. 28, 2013

Related U.S. Application Data

(60) Provisional application No. 61/333,894, filed on May 12, 2010.

(51) Int. Cl.
*G06F 17/00* (2006.01)

(52) U.S. Cl.
USPC .......... 463/17

(58) Field of Classification Search
USPC .......... 463/16–25
See application file for complete search history.

(56) References Cited

U.S. PATENT DOCUMENTS 4,149,728 A 4/1979 Thompson
4,887,819 A 12/1989 Walker
5,540,442 A 7/1996 Orselli et al.
5,746,432 A 5/1998 Feola
5,806,847 A 9/1998 White et al.
6,123,333 A 9/2000 McGinnis, Sr. et al.
6,176,489 B1 1/2001 Astaneha
6,217,022 B1 4/2001 Astaneha
6,264,200 B1 7/2001 Smith
6,267,669 B1 7/2001 Luciano, Jr. et al.
6,302,395 B1 10/2001 Astaneha
6,406,021 B1 6/2002 Nadibaidze
6,406,022 B1 6/2002 Nadibaidze
6,467,770 B1 10/2002 Matosevic
6,520,503 B1 2/2003 Porto
6,601,848 B1 8/2003 Timmons, Sr.
6,761,353 B2 7/2004 Berman et al.
6,769,693 B2 8/2004 Huard et al.
7,152,863 B2 12/2006 Scheb, Jr. et al.
7,165,769 B2 1/2007 Crenshaw et al.
7,255,350 B2 8/2007 Timmons, Sr.
7,367,562 B2 5/2008 Scheb, Jr. et al.
7,431,298 B1 10/2008 Carbonaro
7,527,265 B1 5/2009 Berman (Continued)

OTHER PUBLICATIONS

International Search Report issued on Jul. 14, 2011 for PCT/US2011/034779.

*Primary Examiner* — Ronald Laneau
(74) *Attorney, Agent, or Firm* — Hoffmann & Baron, LLP

(57) ABSTRACT

Exemplary embodiments are directed to a multi-chance casino-based game that can include a roulette-style wheel, a deck of cards, and dice with a corresponding wager board. The multi-chance casino game can provide a player with multiple chances to win on an original wager and can provide an opportunity for wagers to be safe so that if the player does not win, the player will not lose his original wager.

13 Claims, 8 Drawing Sheets

(56) References Cited

U.S. PATENT DOCUMENTS

| | | | | |
|---|---|---|---|---|
| 7,540,498 | B2 | 6/2009 | Crenshaw et al. | |
| 7,637,503 | B2 | 12/2009 | Sorge | |
| 7,669,850 | B1 | 3/2010 | Miller | |
| 7,686,306 | B2 | 3/2010 | An-Yeung | |
| 7,694,971 | B2 | 4/2010 | Sorge | |
| 8,133,105 | B2 * | 3/2012 | Walker et al. | 463/16 |
| 8,398,489 | B2 * | 3/2013 | Lutnick et al. | 463/42 |
| 2002/0074726 | A1 | 6/2002 | Yoseloff et al. | |
| 2003/0071415 | A1 | 4/2003 | Huard et al. | |
| 2003/0098543 | A1 | 5/2003 | Porto | |
| 2004/0036219 | A1 | 2/2004 | Schibetta | |
| 2004/0195771 | A1 | 10/2004 | Huard et al. | |
| 2004/0210507 | A1 * | 10/2004 | Asher et al. | 705/37 |
| 2004/0212150 | A1 | 10/2004 | Huard et al. | |
| 2006/0052157 | A1 * | 3/2006 | Walker et al. | 463/25 |
| 2006/0197284 | A1 | 9/2006 | Jones | |
| 2008/0252004 | A1 | 10/2008 | Au-Yeung | |
| 2008/0258383 | A1 | 10/2008 | Sorge | |
| 2009/0250872 | A1 | 10/2009 | Scheb, Jr. et al. | |
| 2009/0283968 | A1 | 11/2009 | Sorge | |
| 2013/0072278 | A1 * | 3/2013 | Salazar et al. | 463/16 |

* cited by examiner

500

The Odds of Winning 502

504
1. Roulette: 18 to 1
2. Color: 9 to 1 506
3. Card: 3 to 1

508
4. Dice: 4 to 1 510
5. Tri-Color Block: 3 to 1

512
6. 4-Color Vertical: 2 to 1 514
7. Horizontal Wheel number/Card Strip: 2 to 1 up to 8 to 1

516
8. Section-Gold or Silver: 1 to 1
9. Black "0" Box: 47 to 1 518

520
10. 2 Wild Card: 11 to 1

Combination Win Possibilities

522
1. Bet on winning Wheel number and winning Card (in the same Box): win 45 to 1

524
2. If the correlating Dice is thrown, win the "Triple Bonus" payout of 200 to 1. Must have same bet amount on the Dice and Wheel/Card. Winning is on the Box only. The bet from the Dice goes back to the player.

526
3. If player's Wheel number wins and their Dice wins, payout is 26 to 1. Must have same bet amount on the Dice and Wheel. Winning is on the Box only. The bet from the Dice goes back to the player.

528
4. If player's Card wins and their Dice wins, payout is 10 to 1. Must have same bet amount on the Dice. Winning is on the Box only. The bet from the Dice goes back to the player.

530
5. If four Cards of the same suit are drawn (or one, two or three Cards of the same suit plus one, two or three 2 (Wild) Cards of any suit is drawn), all players betting on the correlating Card/suit win by 20 to 1. Player bonus—no bets necessary in this box.

532
6. Bet on Horizontal Wheel number/Card strip, payout is 2:1 up to 8:1. If one number or Card come, payout is 2 to 1. If both number and Card come on the same strip or two Cards, payout is 4 to 1. If the number and two of the Cards come or three Cards, payout is 6 to 1. If the number and three of the Cards come, payout is 8 to 1.

534
7. If four 2 (Wild) Cards are drawn, win 300 to 1. A bet on a winning 2 Card is required to be eligible for this payout.

Fig. 5

MULTI-CHANCE CASINO GAME

CROSS-REFERENCE TO RELATED APPLICATION

The present application claims priority to U.S. Provisional Patent Application Ser. No. 61/333,894 filed May 12, 2010, the disclosure of which is incorporated herein by reference in its entirety.

BACKGROUND

1. Technical Field

Exemplary embodiments are directed to a multi-chance casino-based game providing a player multiple chances to win on an original wager based on a spin of a roulette-style wheel, a drawing of player cards, and/or a roll of dice.

2. Brief Discussion of Related Art

Casinos and patrons thereof are always looking for new and exciting casino games, and are typically interested in games that are easy to understand and that can hold a player's interest for an extended period of time. While roulette is typically a popular game at casinos because it is easy to understand, conventional roulette-style games can limit the number of chances a player has to win based on an original wager and limit the wager options of the player.

SUMMARY

According to one aspect, a method of playing a multi-wager casino-based game providing a player with multiple chances to win based on an original wager is disclosed. The method includes receiving a wager from a player. The wager is marked on a first one of a plurality of wager locations on a wager board. The method also includes identifying whether a first chance winning wager was placed based on an outcome of a first event and a first identifier associated with the first one of the plurality of wager locations and identifying whether a second chance winning wager was placed based on an outcome of a second event and a second identifier associated with the first one of the plurality of wager locations, the first event being independent from the second event.

The wager locations can include wager boxes having box identifiers representing at least one of the first and second identifiers to associate the wager boxes with outcome blocks disposed on a rotatable roulette-style wheel. The wager boxes can be associated with group identifiers to associate the boxes with groups of boxes corresponding to groups of blocks on the roulette-style wheel.

The method can also include spinning the rotatable roulette-style wheel as the first event. The outcome blocks can be radially distributed on the rotatable roulette-style wheel. The outcome blocks have the group identifiers to associate the outcome blocks with the groups and block identifiers to distinguish the outcome blocks within the groups. The method can further include introducing a ball to a spinning surface of the roulette-style wheel and identifying on which one of outcome blocks the ball comes to rest to determine whether the one of the outcome blocks corresponds to wager box on which the wager is placed.

The method can also include drawing a playing card as the second event and identifying a playing card value and playing card suit of the playing card to determine whether the wager location corresponds to the playing card value and playing card suit.

The method can also include identifying whether a third chance winning wager was placed based on an outcome of a third event and a third identifier associated with the one of the plurality of wager locations. The wager boxes include further box identifiers corresponding to possible outcomes of the third event. The third event being a roll of a die, wherein each wager group can be associated with a die value.

The method can also include rolling a die associated with the wager location and identifying a die value to determine whether the die value corresponds to the wager location, and/or identifying whether the wager is safe based on the outcome of at least one of the first and third events. The wager can be identified as being safe in response to the wager being placed within a group of boxes including a box corresponding to an outcome of at least one of the first and third events.

In another aspect, a multi-chance casino based game providing a player with multiple chances to win based on an original wager, the multi-chance casino based game is disclosed. The game can include a rotatable roulette-style wheel and a wager board. The wheel has distributed outcome blocks having group identifiers to associate the outcome blocks with groups of blocks and block identifiers to distinguish the outcome blocks within the groups of blocks. A spinning of the wheel represents a first event. The wager board has wager boxes corresponding to the outcome blocks, the wager boxes including the block identifiers to associate the wager boxes with the outcome blocks disposed on the rotatable roulette-style wheel. The wager board includes wager groups corresponding to the outcome groups. The wager groups include the group identifiers to associate the outcome groups with the wager groups. The wager boxes include further box identifiers corresponding to possible outcomes of a second event that is independent of the first even. The player has multiple chances to win on an original wager including a first chance based on an outcome of the first event and a second chance based on an outcome of the second event.

The further box identifiers for the wager boxes can include a playing card value and a playing card suit and the second event is a drawing of a playing card from a deck of cards. The groups of blocks can be associated with set identifiers to associate the groups of blocks with outcome sets. The groups of boxes can be associated with the set identifiers to associate the groups of boxes with wager sets. The wager sets correspond to the outcome sets.

The groups of boxes can include further group identifiers to associate the groups of boxes with possible outcomes of a third event that is independent of the first and second events. The third event can be a roll of at least one die. The further group identifiers can include the faces of the die and the color of the die.

Any combination of the above features is envisaged. Other objects and features will be come apparent from the following detailed description considered in conjunction with the accompanying drawings, wherein like reference numerals in the various drawings are utilized to designate like components. It is to be understood, however, that the drawings are designed as an illustration only and not as a definition of the limits of the invention.

BRIEF DESCRIPTION OF THE DRAWINGS

FIG. 5 are exemplary odds for one embodiment of the multi-chance casino-based game.

DETAILED DESCRIPTION

Exemplary embodiments include a multi-chance casino-based game. Embodiments of the multi-chance casino game can include a roulette-style wheel, a deck of cards, dice, and the like, with a corresponding wager board. The multi-chance casino game can provide a player with multiple chances to win on an original wager and can provide an opportunity for wagers to be safe so that if the player does not win, the player will not lose his original wager. The multi-chance game can correlate an outcome of wheel spins, drawn cards, and each rolled die with a location on a wager board so that a player can have multiple opportunities to win on his/her wager based on the wheel spin, drawn cards, and/or rolled dice. For example, placing a wager on an outcome of a wheel spin can automatically result in a wager being placed on a correlating playing card and/or a correlating outcome of a roll of a die.

Figure 1:
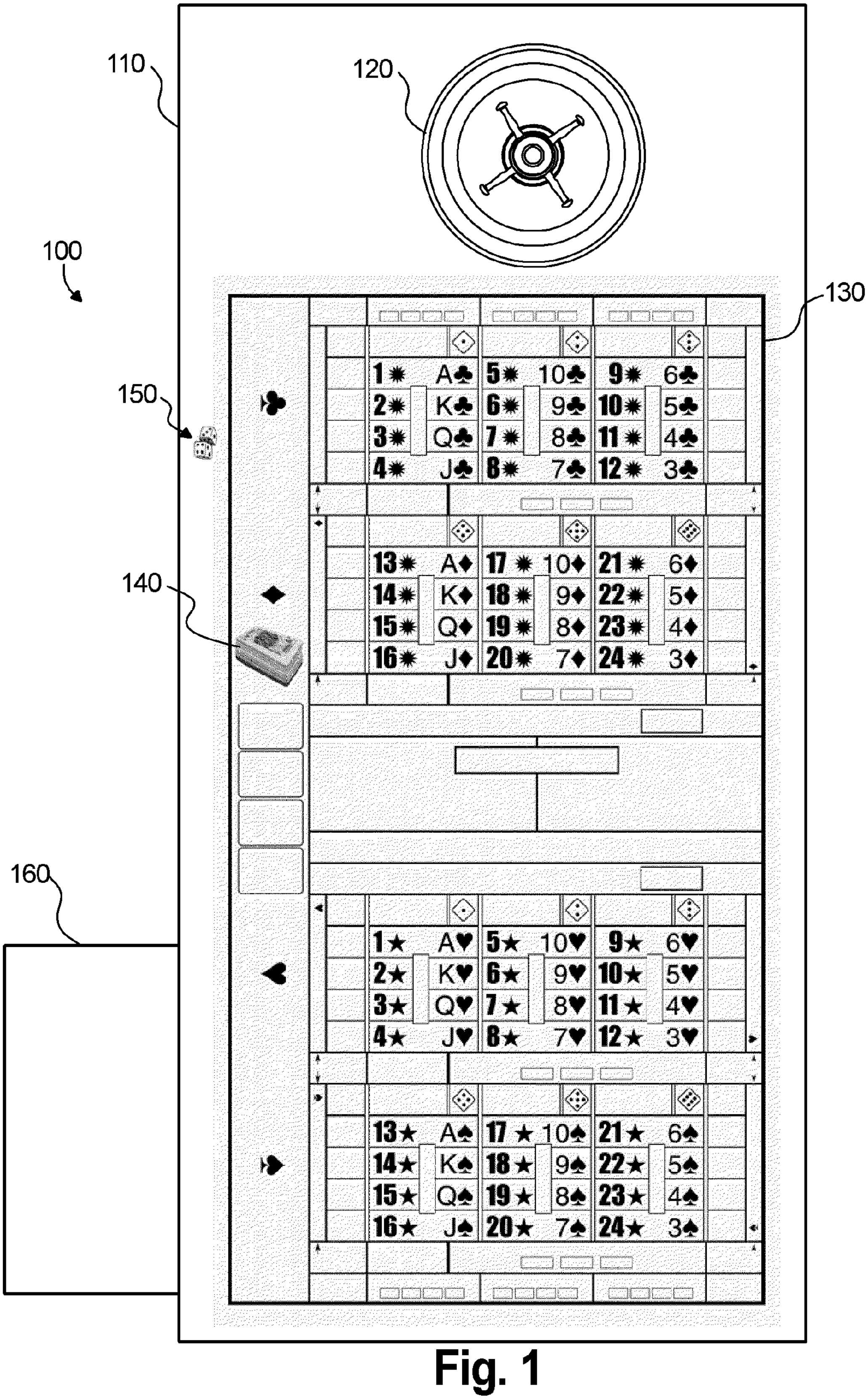
FIG. 1 shows an exemplary multi-chance casino-based game.

FIG. 1 is an exemplary multi-chance casino-based game 100. The game 100 can include a housing 110 having a roulette-style wheel 120 and a wager board 130. Embodiments of the game 100 can also include a deck of playing cards 140, dice 150, and an outcome indicator 160. Players of the game 100 can place one or more wagers on wager locations on the wager board 130. The wager locations can correspond to possible outcomes of a spin of the wheel 120, a drawing of a playing card from the deck of playing cards 140, and/or an outcome of a roll the dice. In some embodiments, the players can have multiple chances to win on their original wager based on the outcome of the spin of the wheel 120, drawing of a playing card from the deck of playing cards 140, and/or an outcome of a roll of the dice. In some embodiments, the original wager placed by a player can be safe so that even though the player's wager does not win, the player retains the original wager amount.

The outcome indicator system 160 can include a display, illuminated sections of the board, a marker placed on the board by the operator, and the like. The outcome indicator 160 can be used to identify outcomes of a spin of the wheel, drawing of the cards, and/or a roll of the at least one die. The outcome provides players with an easy to see and understand view of winning outcomes so that players can follow the game as it is in progress.

Figure 2:
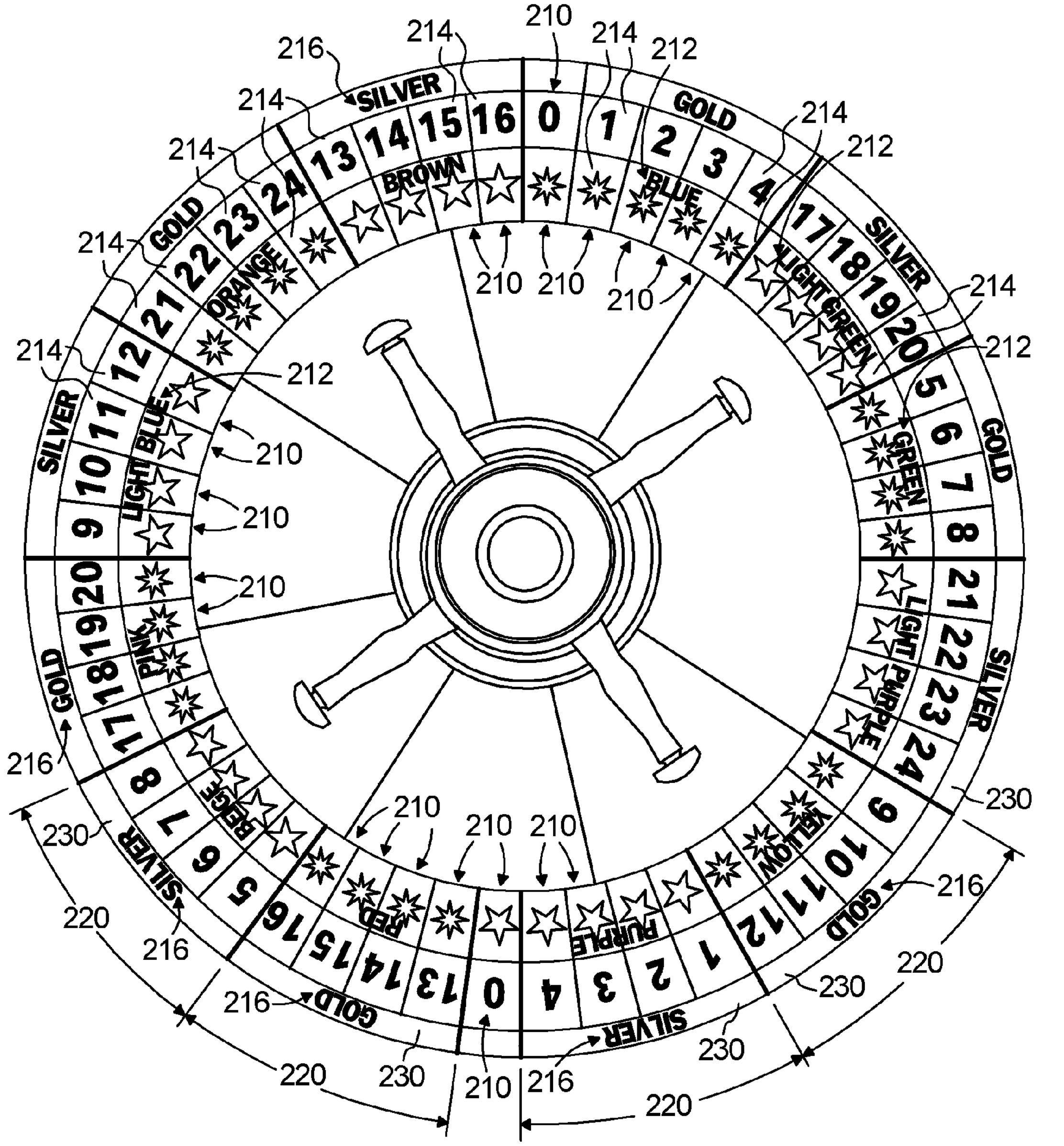
FIG. 2 shows an exemplary roulette style wheel that can be implemented for embodiments of the multi-chance casino-based game.

FIG. 2 depicts an exemplary embodiment of the rotatable roulette-style wheel 120 of the multi-chance casino-based game 100. The wheel 120 can be segmented into outcome blocks 210 having raised perimeters and/or depressed interior surfaces configured to capture, trap, or other retain a ball. The interior surfaces of the sub-blocks can slope downward towards or away from a center axis of the wheel 120. Each of the blocks 210 can be associated with a group identifier 212 and a block identifier 214. Blocks having the same group identifier 212 can be grouped together about the circumference of the wheel 120 to form groups 220 of blocks. In the present embodiment, the group identifier 212 is a color of the blocks 210 so that blocks 210 having the same color can be adjacently positioned about the circumference of the wheel 120. For example, blocks having the color orange can be grouped together and blocks having the color blue can be grouped together.

The block identifiers 214 can uniquely identify blocks in a block group 220. The block identifiers 214 can include numbers (e.g., 1-24) and one of two symbols (e.g., star or sun). The blocks 210 within a group 220 can be associated with consecutive numbers and two blocks, which are in different block groups 220 on the wheel, can have the same set of consecutive numbers. Blocks 210 having the same number can be distinguished based on the group identifier 212 and/or the symbol associated with the block. The symbols of the block identifiers 214 can be specified so that blocks 210 in a block group 220 have the same symbol and so that adjacent block groups have blocks with a symbol that is different than their neighboring block groups. The block groups can be arranged so that the symbols associated with block groups alternate about the circumference of the wheel 120 between the star and the sun symbol. The block groups can be distributed about the circumference of the wheel 120 so that adjacent block groups do not have consecutive numbers at the block group boundaries and/or do not have identifiers in common The wheel 120 can include set identifiers 216 that can be associated with sets 230 of the block groups 220. The set identifiers 216 can be used to form sets 230 of block groups 220. The set identifiers 216 can be represented as a color on the wheel. For example, the set identifiers 216 can be a colored arc section extending along a portion of the circumference of the wheel so that the blocks positioned radially inward of the color arc section are associated with a set of groups having the same set identifier.

In the present embodiment, the wheel 120 includes set identifiers, silver and gold, and six groups 220 of blocks 210 per each of the gold and silver set identifiers. Each block group includes four blocks. Additionally, there are two blocks which are not associated with a block group. As one example, the two blocks can be associated with block identifiers, which can include a zero and a symbol (e.g., sun or star), where the symbol associated with each of the two blocks is different.

In operation, in the present embodiment, the wheel 120 can spin or rotate about its center axis and a small ball can be placed, dropped, or otherwise introduced to surface of the spinning wheel 120. As the wheel 120 spins, the ball can bounce, roll, or otherwise change its location with relative to the spinning surface of the wheel 120. Eventually, as the wheel slows down and/or comes to a stop, the ball can settle into one of the blocks 210 on the wheel 120. The block, group, and/or set of blocks within which the ball comes to rest and/or settles can correspond to one or more locations on the wager board 130 of the multi-chance game 100.

Figure 3:
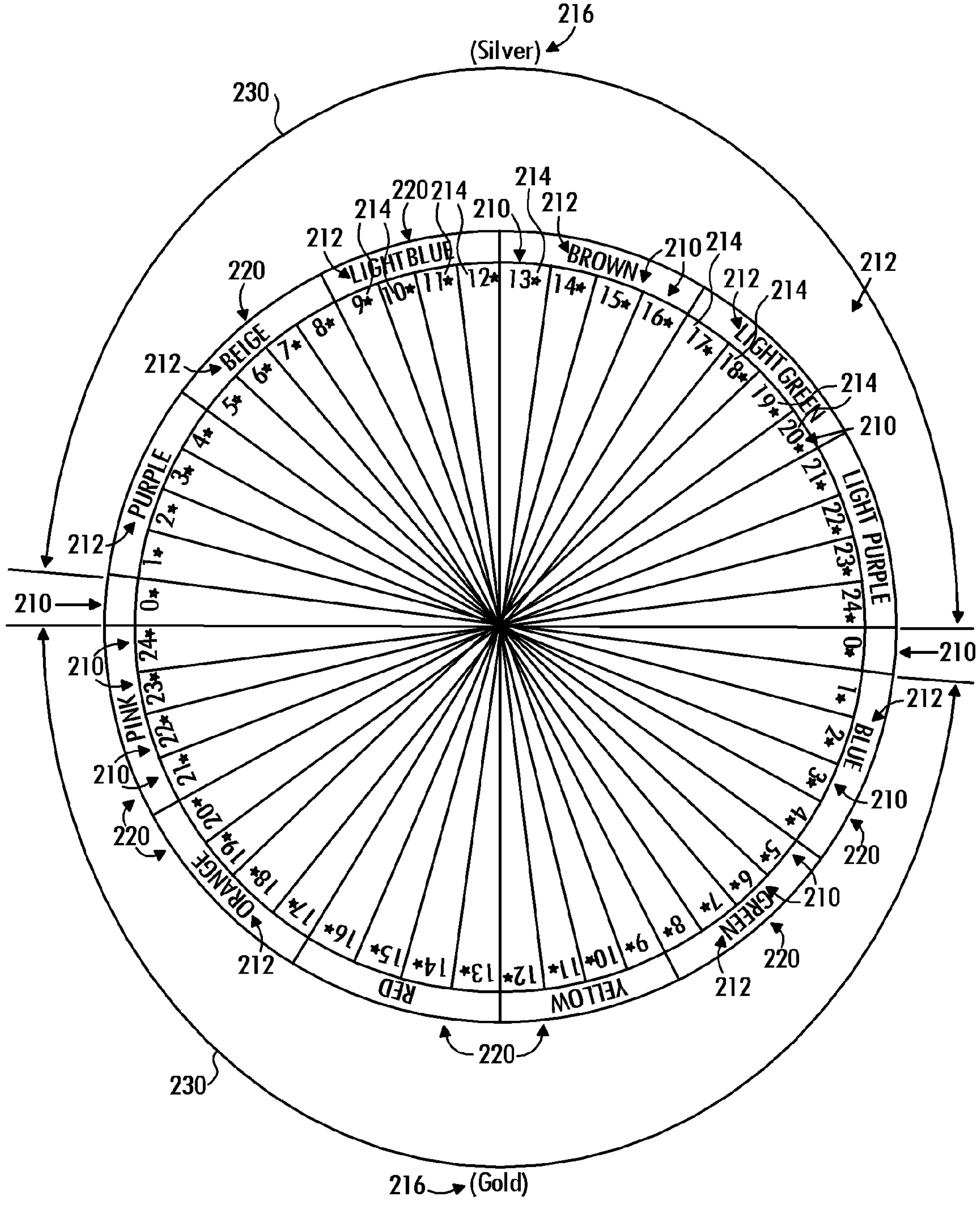
FIG. 3 shows another exemplary roulette style wheel that can be implemented for embodiments of the multi-chance casino-based game.

FIG. 3 depicts another exemplary embodiment of the rotatable roulette-style wheel 120 of the multi-chance casino-based game 100 in which the blocks 210, groups 220, and sets 230 can be arranged differently than the embodiments of the wheel 120 shown in FIG. 2. Blocks 210 of groups 220 can be grouped together and groups having common set identifiers can be grouped together on the wheel 120.

While FIGS. 2 and 3 are illustrative of embodiments of the wheel 120, those skilled in the art will recognize that other variations and arrangements of the wheel 120 are possible. For example, more or fewer blocks, groups of blocks, sets of groups, and the like, can be specified.

Figure 4A:
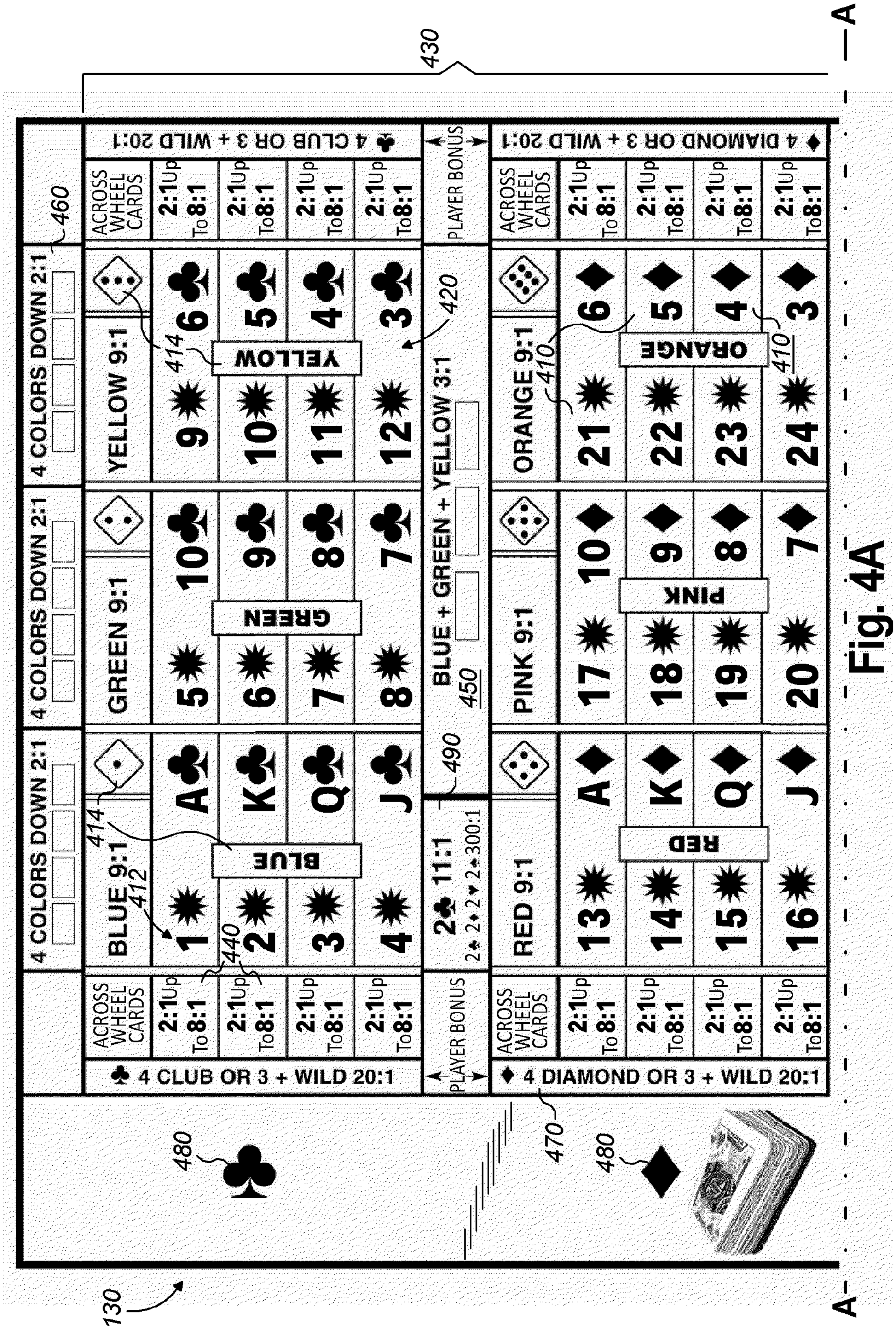
FIG. 4 shows an exemplary wager board that can be implemented for embodiments of the multi-chance casino-based game.
Figure 4B:
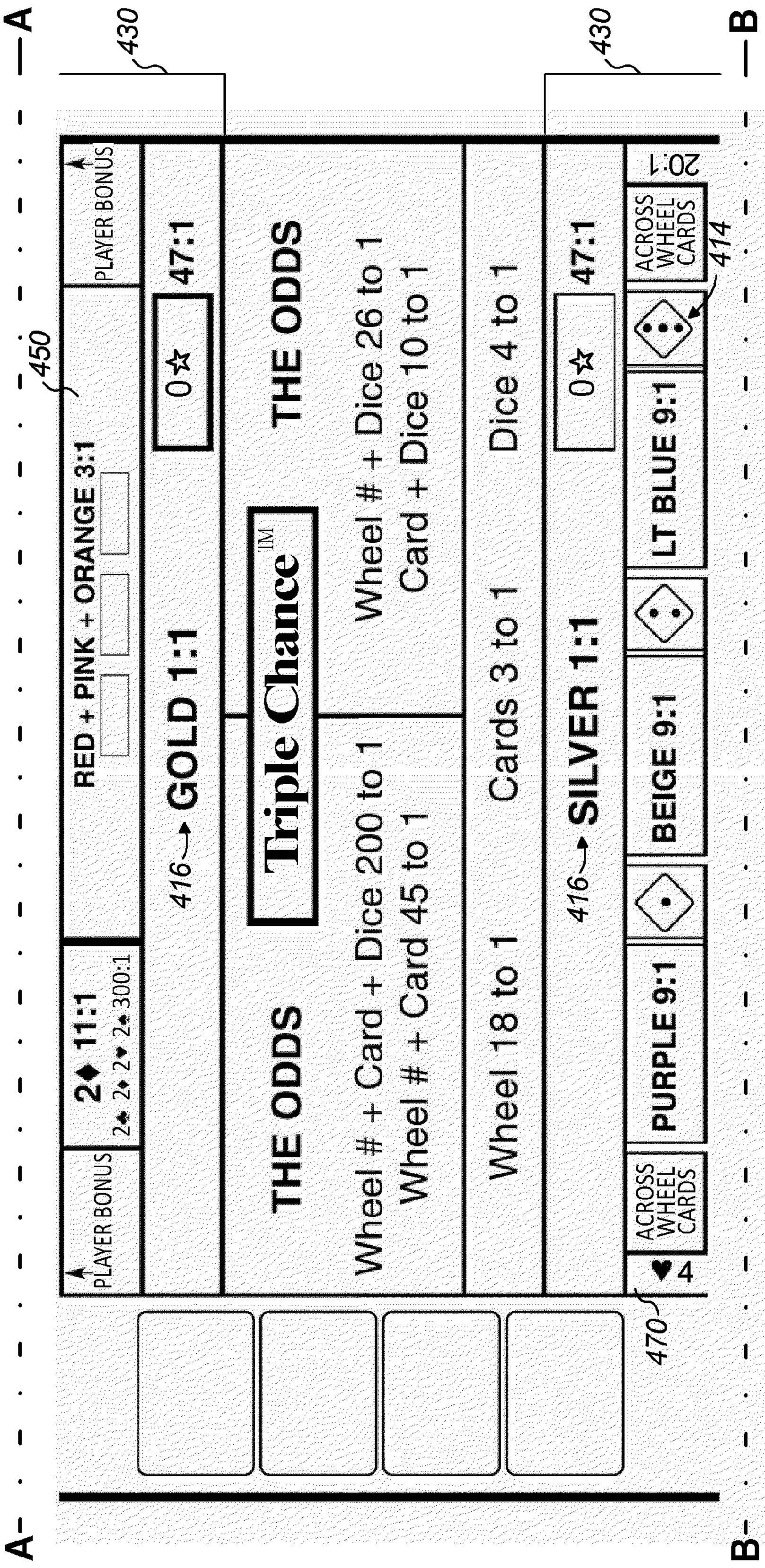
Figure 4C:
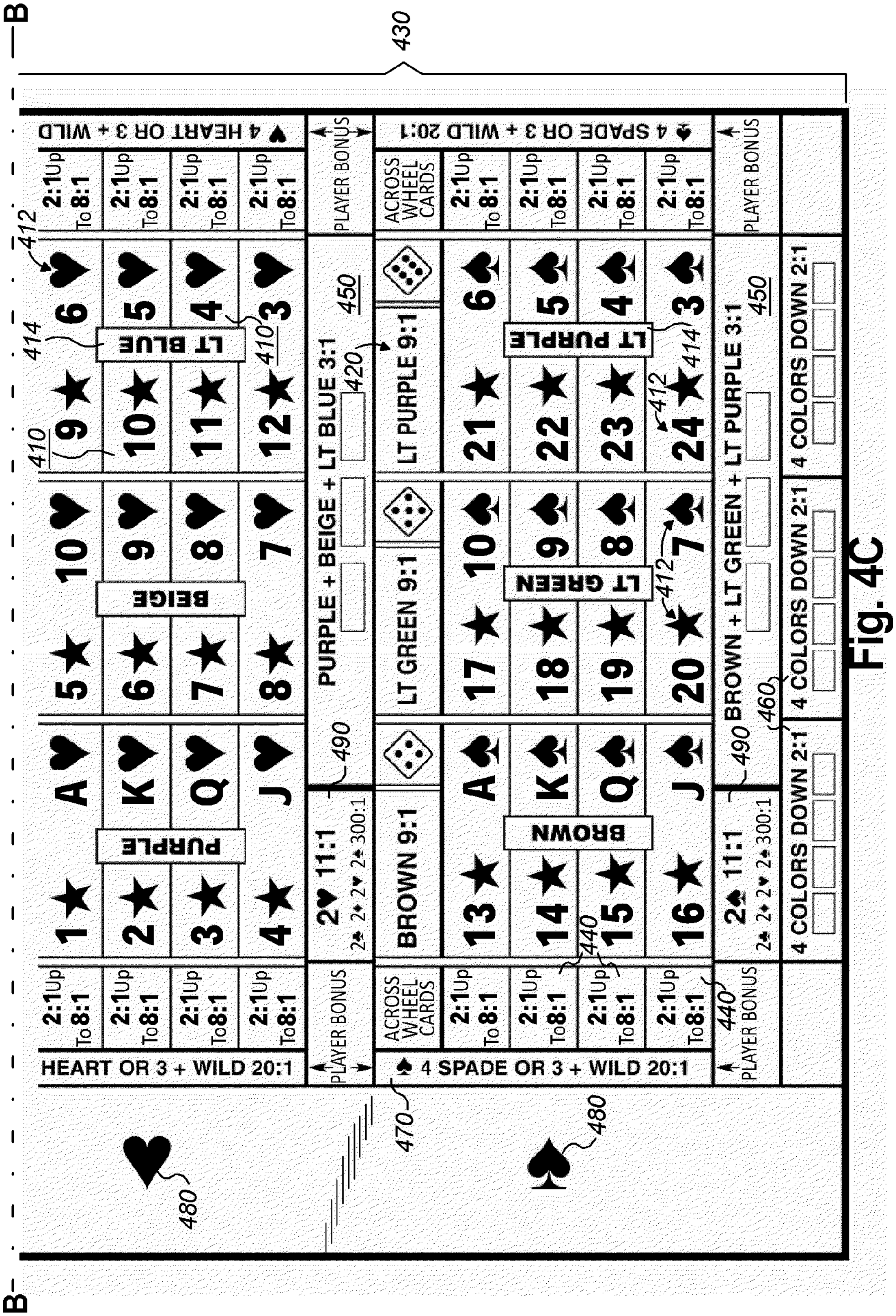

FIG. 4 depicts an exemplary embodiment of the wager board 130 that can include one or more multi-chance wager locations. Each of the wager locations can be assigned odds and/or multipliers that can multiply a wager amount by a predetermined value (e.g., 2×, 3×, 4×, 2:1, 3:1, 4:1, and the like). The layout of the board 130 can include wager boxes 410 that are grouped together into box groups 420. The box groups 420 can be grouped together into sets 430. The board 400 can include boxes 410 that correspond to the blocks 210 on the wheel 120, box groups 420 that correspond to block groups 220 on the wheel 120, and sets 430 of groups that correspond to sets 230 of groups on the wheel.

In the present embodiment, there is a one-to-one correlation between blocks 210 and the boxes 410 such that each block 210 on the wheel 120 has a corresponding box 410 on the board 400 and there is one-to-one correlation between blocks groups 220 and the box groups 420 such that each block group 220 on the wheel 120 has a corresponding box group 420 on the board 400. Likewise, there is a one-to-one correlation between the sets 230 of block groups on the wheel 120 and the sets 430 of box groups 420 on the board such that each set 230 on the wheel 120 has a corresponding set 430 on the board 400.

The boxes 410 can be associated with box identifiers 412, box group identifiers 414, and set identifiers 416. The box identifiers 412 can uniquely identify boxes 410 in a box group 420. The box identifiers 412 of a box 410 can include the same number and symbol as the block identifiers 214 of the block 210 corresponding to the box 410. For example, if the block identifier includes a "1" and a star, the box identifier of the corresponding box 410 on the board 400 includes a "1" and a star. Each box 410 can also be associated with a further box identifier represented as a playing card value and suit. For example, in the present embodiment, the box identifiers 414 of a box 410 can also include a playing card value (e.g., 10, jack, queen, king, ace) and a playing card suit (e.g., hearts clubs, diamonds, spade), which can also uniquely identify individual boxes 410 on the board 400. The blocks 410 of the group 420 can include playing card values having the same suit (e.g., hearts).

The boxes 410 can be associated with group identifier 414 such that boxes having the same group identifier 414 can be grouped together on the board 400. In the present embodiment, the group identifier 414 is a color of the boxes 410 so that boxes 410 having the same color can be adjacently positioned on the board 400. For example, boxes having the color orange can be grouped together and boxes having the color blue can be grouped together. The group identifiers 414 can correspond to the group identifiers 212 such that the group identifiers 212 and 414 of corresponding groups 220 and 420 can be identical. For example, if a group identifier 414 is orange, the group identifier 212 of the corresponding group 220 is also orange.

The group identifier 414 can also include an image of a face of a color-coded die such that each of the groups 420 can be associated with a number on a face of a color-coded die. For example, an image of a face of a die can be disposed in each group 420, but outside the boxes 410 of the groups 420. One or more groups can be associated with a red die having six faces based on the image disposed in the groups so that each group can have an image of a face of the red die corresponding to a number on a face of the red die. One or more groups can be associated with a white die having six faces based on the image disposed in the groups so that each group can have an image corresponding to a number on a face of the white die.

In some embodiments, groups 420 within a set 430 can correspond to the same color die. In some embodiments, each of the groups associated with the red die can be associated with a different face of the red die such that each of the groups corresponds to a different number on the red die. In some embodiments, each of the groups 420 associated with the white die can be associated with a different face of the white die such that each of the groups 420 corresponds to a different number on the white die.

The groups 420 of boxes can be associated with set identifiers 416 such that groups 420 of boxes having the same set identifier can be grouped together on the board 400. In the present embodiment, the set identifiers 416 are rectangles having defined perimeters with a colored interior. The groups 420 of boxes belonging to a set of groups are disposed within the perimeter of the rectangle of the set identifier 416 associated with the set. In the present embodiment, the board 400 can be segmented to include two set identifiers, one being a rectangle with a silver interior and the other being rectangle having a gold interior. Each set 430 can include six groups of boxes. The set identifiers 416 can correspond to the set identifiers 216 such that the set identifiers 216 and 416 of corresponding set 230 and 430 can be the same color. For example, if a set identifier 416 is silver, the set identifier 216 of the corresponding set 230 is also silver.

The boxes 410, groups 420, and sets 430 can each form wager locations. For example, each of the boxes can provide an area in which a player can wager on an outcome corresponding to at least one of the box identifiers, each of the groups can provide an area in which a player can wager on an outcome corresponding to at least one of the group identifiers, and each set can include an area in which a player can wager on an outcome corresponding to at least one of the set identifiers.

Additional wager locations can be included on the board 130. As one example, the board 400 can include wager locations to place a wager for the possible outcomes in a corresponding one of the rows 440 of boxes, rows 450 of groups, and/or columns 460 of groups 420. As another example, the board can include wager locations corresponding to a suit of one or more drawn cards. The player can wager on card accumulation boxes 470, card suit areas 480, and/or card value and suit boxes 490 corresponding to a card value and suit not included in any of the boxes 410.

While FIG. 4 is illustrative of an embodiment of the board 130, those skilled in the art will recognize that other variations and arrangements of the board 130 are possible. For example, in some embodiments, the board 130 can include more or fewer, boxes, groups, sets, box identifiers, group identifiers, set identifiers, wager locations, and the like.

Embodiments of the multi-chance game provide players with multiple opportunities or chances to win based on one or more of their original wagers. For example, the player can place a wager by placing a wager marker on one of the wager locations, such as one of the boxes, groups, sets, rows, columns, and the like. If the player places a wager marker on one of the boxes 410, the player is wagering that an event corresponding to one of the identifiers associated with the box will occur. If the player places a wager marker on one of the groups 420, the player is wagering that an event corresponding to one of the identifiers associated with the group will occur. If the player places a wager marker on one of the sets 430, the player is wagering that an event corresponding to one of the identifiers associated with the set will occur. If a player places a wager marker on one of the rows 440, the player is wagering that at least one of the outcomes of the event will correspond to one of the box identifiers associated with the row. If a player places a wager marker on one of the rows 450, the player is wagering that at least one of the outcomes of the events will correspond to one of the group identifiers associated with the row. If the player places a wager marker on one of the columns 460, the player is wagering that at least one of the outcomes of the events will correspond to one of the group identifiers associated with the column 460. If the player places a wager marker on one of the card accumulation boxes 470, the player is wagering that at least three of the drawn cards will correspond to one of the card suit associated with the card accumulation box 470 and that at least a fourth card is associated with the same card suit or that a wild card is drawn. If the player places a wager marker on one of the card suit areas 480, the player is wagering that at least one of the drawn cards will correspond to the card suit associated with the card suit area 480. If the player places a wager marker on one of the card value and suit boxes 490, the player is wagering that at least one of the drawn cards will correspond to the card value and suit associated with the card value and suit box 490.

In some embodiments, the player can have up to three or more chances to win on an original wager. In a first chance, a player can win or be safe on an outcome a wheel spin. In a second chance, a player can win on an outcome of at least one drawn card. In a third chance, the player can win or be safe on an outcome of a roll of dice.

As one example, if the player places a wager on one of the boxes, the player can be automatically placing a wager on an outcome of a wheel spin, a correlating playing card, and a correlating outcome of a roll of a die. The player can automatically win if the ball comes to rest on the block of the wheel corresponding to the box and/or a card value and suit is drawn that matches the card value and suit associated with the box. If both events occur, the player can be a double winner. If the die color and value associated with the group having the box comes up, it protects the wager on the block from losing (i.e., the wager is safe) and/or multiplies the payout associated with the wager. For example, when a player wagers on a box for which the ball comes up and/or the playing card corresponding to the box is drawn, the payout for the wager can be multiplied if the die value of the colored die associated with the box results from a roll of the die.

For the case where the player wagers on a box that does not come up (e.g., the ball does not come to rest on the corresponding block), but the ball comes to rest in the group associated with the corresponding block, the player's wager is "safe" so that the player does not lose his wager. The player still has one or more chances to win based on his original wager if a card value and suit is drawn that matches the card value and suit combination of the box. The player's wager can also be "safe" of the outcome of a roll of one of the dice corresponds to the group having the box within which the player wagered.

If a player wagers on a box for which the ball comes up and for which a matching card is drawn, the player is a double winner. If a player wagers on a box for which the ball comes up and the outcome of one of the rolled die corresponds to the group having the box, the player is a double winner. If a player wagers on a box for which a matching card is drawn and the outcome of one of the rolled die corresponds to the group having the box, the player is a double winner. If a player wagers on a box for which the ball comes up, a matching card is drawn, and the outcome of one of the rolled die corresponds to the group having the box, the player is a triple winner.

FIG. 5 are exemplary odds 500 for possible wager locations on the board including possible wager locations corresponding to a combination of possible outcomes. Odds 502 correspond to a winning wager on a box 410 of the board corresponding to block on the wheel on which the ball comes to rest. Odds 504 correspond to a winning wager on a color of a group 420 on the board. Odds 506 correspond to a winning wager on a box 410 corresponding to a drawn card associated with the box 410. Odds 508 correspond to a wager on an outcome of a roll of the dice associated with a group 420. Odds 510 correspond to an outcome matching wager location 450 for which the outcomes of the events are colors of the three groups in a row. Odds 512 correspond to an outcome matching wager location 460 for which the outcomes of the events result in colors of the four groups in a column. Odds 514 and 532 correspond to a wager that the outcome of the wheel spin and drawn cards matches the wager location 440 corresponding to one or more boxes 410 in a row of boxes 410 across the board 400. Odds 516 correspond to a winning wager on a set color (i.e. silver or gold). Odds 518 correspond to a winning wager on a box 410 corresponding an outcome of the spin of the wheel for the block 210 having a zero is selected. Odds 520 correspond to a winning wager on one of the wager locations 490 that corresponds to a card value of 2 being drawn. Odds 522 correspond to a wager on a box 410 for which both the outcome of the wheel and a drawn card are associated. Odds 524 correspond to a wager on a box 410 for which the outcome of the wheel, a drawn card, and a rolled die are associated. Odds 526 correspond to a wager on a box 410 for which both the outcome of the wheel and a rolled die are associated. Odds 528 correspond to a wager on a box 410 for which both the outcome of a drawn card and a rolled die are associated. Odds 530 correspond to a winning wager placed on the wager location 470 for which at least three card of the same suit are drawn and a fourth card drawn is of the same suit or has a card value of 2. Odds 534 correspond to a winning wager placed on the wager location where four cards are drawn with a card value of two.

Figure 6:
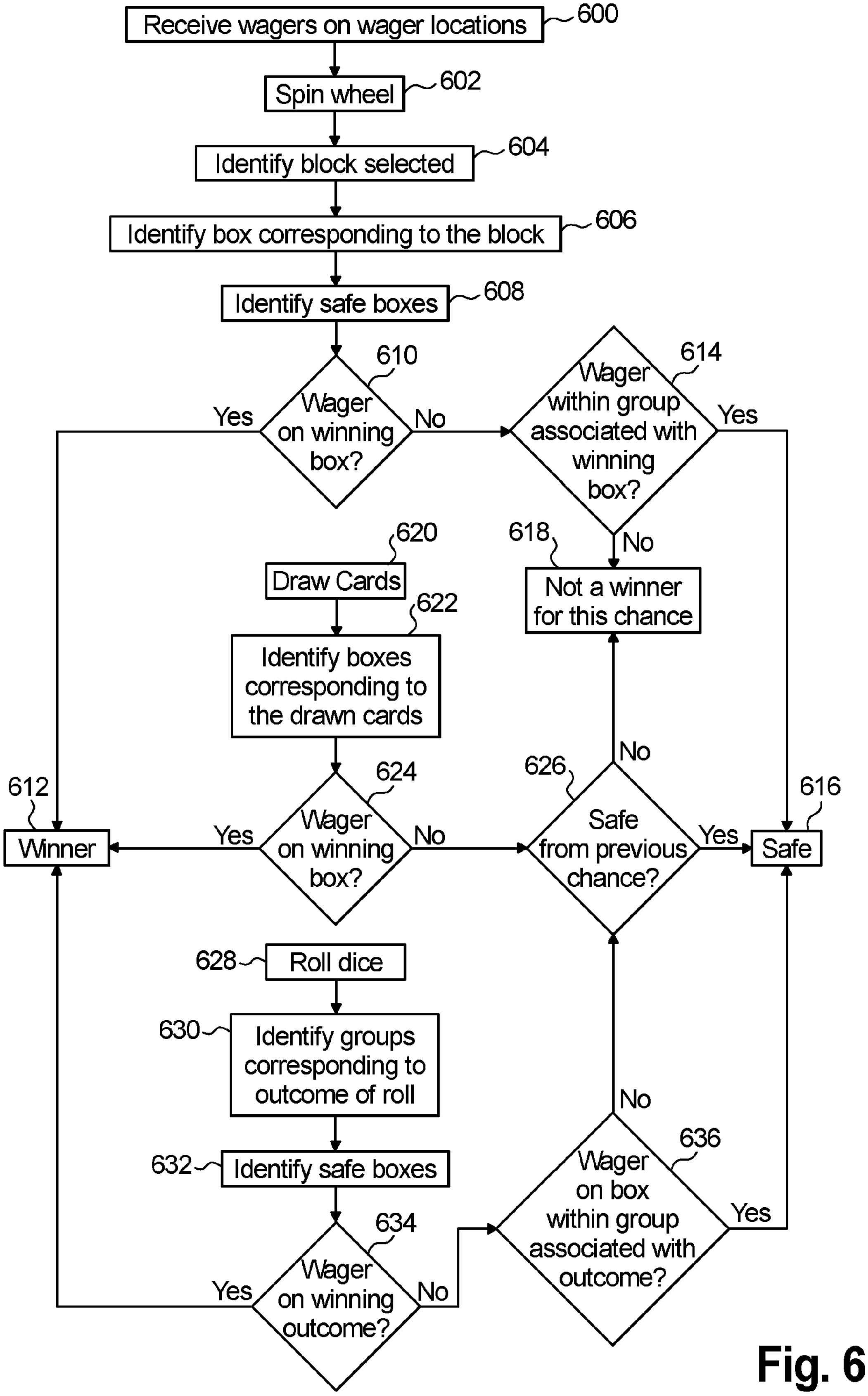
FIG. 6 is a flowchart illustrating an exemplary round of the multi-chance casino-based game.

FIG. 6 is a flowchart illustrating an exemplary round of the multi-chance casino-based game. To begin playing the game, players place wagers on wager locations on the wager board, such as within a box, group, set, row, column, card suit, and the like (600). The players can select the wager locations by placing a wager marker, such one or more casino chips, on the wager locations. Once the wagers have been placed, the operator sets the wheel in motion and adds a ball to the spinning wheel (602). As the wheel slows down and/or comes to a rest, the ball settles into one of the blocks on the wheel. For example, the ball can settle on the block having a block identifier of a "2" and star and a group identifier of the color blue. The block on which the ball settles corresponds to at least one wager location on the board and the block identifiers of the block are identified (604). For example, the block can correspond to the box having the box identifier "2" and star and a group identifier of blue. The operator of the game can place a marker on the winning box on the board, the winning box can be illuminated, and/or the box identifiers corresponding to the block identifiers can be displayed on a display to identify the winning box (606). The remaining boxes within the group having the winning box can be marked as being safe, which indicates that players who choose any of these wager locations do not lose their original bets and can still have an opportunity to win (608). For example, the boxes having the numbers 1, 3, and 4 with a sun are safe.

If any player placed a wager on the winning box (610), the player is a winner (612). A wager on a one of the boxes corresponding to an outcome of a wheel spin can automatically provide a wager on a correlating playing card and/or a correlating outcome of a roll of a die. If a player did not place a wager on the box corresponding to the block identified by the ball on the wheel (610), but wagered on another box within the group corresponding to the winning box (614), the player's original wager can be safe (616). If a player did not wager on the winning box or on another box in the group including the winning box, the player's wager is not safe and the player is not a winner for this chance (618). Players that did not place a wager on the winning box are not winners at this point, but still have more chances to win.

At this point, the game proceeds to a second chance for the players to win and/or multiply a winning wager. For the second chance, four cards can be drawn from the deck of cards (620), and boxes on the board corresponding to the drawn cards can be identified (622). The boxes on the board corresponding to the drawn cards can be identified by placing a marker on the winning boxes, illuminating the winning boxes, and/or displaying the card values and suits on a display.

If any one of the players placed a wager on a box corresponding to any one of the drawn cards (624), the player is a winner (612). For the case where a player wager on a box corresponding to a block on which the ball came to rest and corresponding to a drawn card, the player is a double winner and the player's winnings can be multiplied based on a multiplier associated with odds these events occurring. If a player did not wager on the winning box (624) and is not safe from the outcome of the wheel spin (626), the player's wager is not safe and the player is not a winner for this chance (618).

Players still have more chances to win or be safe on an original wager based on an outcome of a roll of dice. For this chance, colored dice can be rolled (628), and a group on the board corresponding to outcome of each die can be identified (630). The boxes within the group corresponding to the winning outcomes of the roll of the dice can be marked as being safe, which indicates that players who choose any of these wager locations do not lose their original bets (632). If any one of the players placed a wager on the outcome of one of the dice (e.g., a wager at the group level) (634), the player is a winner (612). If the player did not wager on the winning outcome of one of the dice (634), but wagered on a box associated with the outcome of one of the colored dice (636), the player's wager can be safe (616). If a player did not place a wager on the outcome of the winning roll (634), did not wager on a box associated with the outcome of one of the dice (636), and was not safe from a previous chance (626), the player is not a winner for this chance (618). For the case where a player wager on a box corresponding to a block on which the ball came to rest, a drawn card, and an outcome of one of the dice, the player is a triple winner and the player's winnings can be multiplied based on a multiplier associated with odds these events occurring.

At the end of the round, players that won based on their wagers are paid, player who did not win on any chance, but are safe based on the wager receive their original wagers back, and players who did not win on any chance and were not safe lose their wagers. While the order of the events in exemplary round of the game included spinning the wheel, drawing the cards, and rolling the dice, those skilled in the art will recognize that the events of a round of the game can be performed in a different order. As one example, the order in which the events can be performed can be a spin of the wheel, a roll of the dice, and a drawing of the cards. As another example, the order in which the events are performed can be a drawing of the cards, a roll of the dice, and a spin of the wheel or a drawing of the cards, a spin of the wheel, and a roll of the dice. As yet another example, the order in which the events are performed can be a roll of the dice, a spin of the wheel, and a drawing of the cards or a roll of the dice, a drawing of the cards, and a spin of the wheel.

Those skilled in the art will recognize that variations and/or other implementations of the game are possible to give a player multiple chances to win on an original wager. For example, a player can place a wager on one of the wager locations corresponding to a row of boxes across different groups. For this wager, a player can win if any one of the boxes in the row are identified as winners and/or if any of the drawn cards correspond to the boxes in the row.

While exemplary embodiments have been described herein, it is expressly noted that the present invention is not limited to these embodiments, but rather the intention is that additions and modifications to what is expressly described herein are also included within the scope of the invention. Moreover, it is to be understood that the features of the various embodiments described herein are not mutually exclusive and can exist in various combinations and permutations, even if such combinations or permutations are not made express herein, without departing from the spirit and scope of the invention.

What is claimed is:

1. A multi-chance casino based game providing a player with multiple chances to win based on an original wager, the multi-chance casino based game comprising:

a rotatable roulette-style wheel having distributed outcome blocks, the outcome blocks having group identifiers to associate groups of outcome blocks and block identifiers to distinguish the outcome blocks within the groups of outcome blocks, a result from spinning the wheel indicating a winning outcome block; and a wager board having wager boxes corresponding to the outcome blocks, the wager boxes including the block identifiers to associate each of the individual wager boxes with a different one of the outcome blocks disposed on the rotatable roulette-style wheel, the wager board further including wager groups corresponding to the groups of outcome blocks, the wager groups including the group identifiers to associate the groups of outcome blocks with the wager groups, the wager boxes including further box identifiers to associate each of the individual wager boxes with a different playing card value and suit, the wager board further including a separate outcome block in each wager group corresponding to the result of rolling two dice which are distinguishable from each other;

wherein the player has multiple chances to win on an original wager including a first chance based on the result from spinning the wheel, a second chance based on drawing at least one card from a deck of playing cards, and a third chance based on the roll of the dice.

2. The multi-chance casino based game of claim 1, wherein the groups of blocks are associated with set identifiers to associate the groups of blocks with outcome sets.

3. The multi-chance casino based game of claim 2, wherein the groups of boxes are associated with the set identifiers to associate the groups of boxes with wager sets, the wager sets corresponding to the outcome sets.

4. The multi-chance casino based game of claim 1, wherein placement of the original wager on one of the wager boxes corresponding to one of the outcome blocks on the roulette-style wheel is an automatic wager on a playing card included in the wager box.

5. A multi-chance casino based game providing a player with multiple chances to win based on an original wager, the multi-chance casino based game comprising:

a rotatable roulette-style wheel having distributed outcome blocks, the outcome blocks having block identifiers, a spin of the wheel representing a first event; and a wager board having wager boxes corresponding to the outcome blocks, the wager boxes including the block identifiers to associate the wager boxes with the outcome blocks disposed on the rotatable roulette-style wheel, the wager board including further box identifiers corresponding to possible playing cards to be drawn from a deck of playing cards, a drawing of at least one card from the deck of playing cards being a second event, and separate wager boxes being associated with a die color and value, a roll of the die representing a third event, wherein placement of the original wager on one of the wager boxes comprises a wager on an outcome of the spin of the wheel and an outcome of the drawing of the playing cards, and placement of an additional wager in a wager box associated with a die color and value provides a further chance to win based on an outcome of the rolled die.

6. A multi-chance game providing a player multiple chances to win based on a single wager, the multi-chance game comprising:

a wager board including a plurality of first wager locations, each of the plurality of first wager locations including a first identifier and a second identifier different from the first identifier;

a first event generator, the first event generator determining a first random outcome, a first chance winning wager being determined when the first random outcome matches the first identifier; and a second event generator, the second event generator determining a second random outcome, a second chance winning wager being determined when the second random outcome matches the second identifier, the first event generator being independent from the second event generator;

wherein each of the plurality of first wager locations is defined by a unique wager box, wherein each wager box has a different first and second identifier than each other wager box, wherein the wager board includes a plurality of second wager locations, the second wager locations each including a group identifier, each group identifier associated with more than one wager box, each of the second wager locations being associated with a different set of wager boxes than each other of the second wager locations, wherein the first event generator is a rotatable roulette-style wheel, the second event generator is a deck of cards, and a third event generator is a multi-sided die, the third event generator determining a third random outcome, wherein each of the plurality of second wager locations includes a third identifier corresponding to an outcome of rolling the die, a third chance winning wager being determined when the third random outcome matches the third identifier.

7. A casino based game comprising:

a wager board having two distinct sections identified by different colors, each section including six group boxes each identified by a distinct color different from each other and the section colors, each group box being divided into four outcome boxes, each outcome box including a first identifier corresponding to numbers on a roulette-style wheel having at least forty-eight distinct outcomes and a second identifier corresponding to a playing card value and suit such that two blocks of three colored group boxes are grouped according to playing card suit, each group box further including a separate die outcome box corresponding to numbers and a colors on a pair of dice, the wager board further including separate outcome boxes for four remaining playing cards not provided as a second identifier;

wherein a player has multiple chances to win on an original wager including a first chance based on a result of spinning the roulette wheel, a second chance based on drawing at least one card from a deck of playing cards, and a third chance based upon a roll of the dice.

8. The casino based game of claim 7, wherein a player may make a wager on at least one of a section, a group box, an outcome box, a die outcome box, and a playing card suit.

9. The casino based game of claim 7, wherein a player may wager on a group box and not lose the wager if the outcome of the roll of the dice corresponds to the die outcome box in the group box, even if there is no match of the wager with the outcome of the roulette wheel or drawing of the playing card.

10. The casino based game of claim 7, wherein a player may make a first wager on the outcome of the roulette wheel and the outcome of the drawing from the deck of playing cards by placing a wager in the outcome box.

11. The casino based game of claim 10, wherein a player may make a second wager on the roll of the dice by placing a wager on the die outcome box in the same group box as the first wager, the first and second wagers providing a chance to win based on the outcome of a spin of the roulette wheel, the drawing of the playing and the roll of the dice.

12. The casino based game of claim 7, wherein four cards are drawn from the deck of cards.

13. The casino based game of claim 7, wherein a wager in an outcome box provides a first chance to win based on the outcome of the roulette wheel, a second chance to win based on the drawing of a playing card, and a third chance to push the bet based on the outcome of the rolling of the dice.

* * * * *